(12) United States Patent
McCann et al.

(10) Patent No.: US 7,925,516 B2
(45) Date of Patent: Apr. 12, 2011

(54) LEVERAGING GLOBAL REPUTATION TO INCREASE PERSONALIZATION

(75) Inventors: Robert Lee McCann, Fall City, WA (US); Geoffrey John Hulten, Lynnwood, WA (US); Harry S. Katz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 423 days.

(21) Appl. No.: 12/048,594

(22) Filed: Mar. 14, 2008

(65) Prior Publication Data

US 2009/0234663 A1 Sep. 17, 2009

(51) Int. Cl.
*G06Q 99/00* (2006.01)
*G06F 15/16* (2006.01)

(52) U.S. Cl. .......................................... 705/1.1; 709/206

(58) Field of Classification Search .................. 705/1.1, 705/206
See application file for complete search history.

(56) References Cited

U.S. PATENT DOCUMENTS

| | | | |
|---|---|---|---|
| 5,850,520 A | 12/1998 | Griebenow et al. | |
| 5,903,721 A | 5/1999 | Sixtus | |
| 6,892,178 B1 | 5/2005 | Zacharia | |
| 6,892,179 B1 | 5/2005 | Zacharia | |
| 7,401,235 B2 | 7/2008 | Mowers et al. | |
| 7,444,518 B1 | 10/2008 | Dharmarajan et al. | |
| 7,639,672 B2 | 12/2009 | Foote | |
| 7,711,684 B2 | 5/2010 | Sundaresan et al. | |
| 2002/0046041 A1 | 4/2002 | Lang | |
| 2003/0212566 A1 | 11/2003 | Fergusson et al. | |
| 2003/0217288 A1 | 11/2003 | Guo et al. | |
| 2004/0017899 A1 | 1/2004 | Garfinkel et al. | |
| 2004/0122730 A1 | 6/2004 | Tucciarone et al. | |
| 2004/0128321 A1 | 7/2004 | Hamer | |
| 2004/0199770 A1 | 10/2004 | Roskind | |
| 2004/0230527 A1 | 11/2004 | Hansen et al. | |
| 2005/0052998 A1 | 3/2005 | Oliver et al. | |
| 2005/0080857 A1* | 4/2005 | Kirsch et al. | 709/206 |
| 2005/0097320 A1 | 5/2005 | Golan et al. | |
| 2005/0210272 A1 | 9/2005 | Fotta | |
| 2006/0168024 A1* | 7/2006 | Mehr et al. | 709/206 |
| 2006/0212925 A1 | 9/2006 | Shull et al. | |
| 2006/0253583 A1 | 11/2006 | Dixon et al. | |
| 2006/0253584 A1* | 11/2006 | Dixon et al. | 709/225 |
| 2006/0277259 A1 | 12/2006 | Murphy et al. | |
| 2007/0027992 A1* | 2/2007 | Judge et al. | 709/227 |
| 2007/0078675 A1 | 4/2007 | Kaplan | |
| 2007/0130349 A1 | 6/2007 | Wong | |

(Continued)

OTHER PUBLICATIONS

Kerschbaum et al., "PathTrust: A Trust-Based Reputation Service for Virtual Organization Formation," printed from http://www.fkerschbaum.org/itrust06.pdf, 14 pages, Germany.

(Continued)

*Primary Examiner* — Jamisue A Plucinski
*Assistant Examiner* — Maame Ofori-Awuah
(74) *Attorney, Agent, or Firm* — Senniger Powers LLP

(57) ABSTRACT

A reputation data store provides reputation information to a user regarding the source of an electronic communication via a client. When the client receives an electronic communication, the client queries a reputation data store for reputation information regarding the source of the electronic communication. The client receives the reputation information from the reputation data store and displays the reputation information to the user. The user then decides whether to interact with the source of the electronic communication based on the displayed reputation information. Alternatively, an administrator may decide whether the user may interact with the source of the electronic communication.

18 Claims, 4 Drawing Sheets

U.S. PATENT DOCUMENTS

| | | |
|---|---|---|
| 2007/0130351 A1 | 6/2007 | Alperovitch et al. |
| 2007/0203781 A1 | 8/2007 | Kerschbaum et al. |
| 2007/0208940 A1 | 9/2007 | Adelman et al. |
| 2007/0214506 A1 | 9/2007 | Rao et al. |

OTHER PUBLICATIONS

Unknown, "Reputation Service," printed from http://www.commtouch.com/Site/Products/ip_reputation.asp, 2 pages, Commtouch, US.

Chirita et al., "Personalized Reputation Management in P2P Networks," printed from http://www.kbs.uni-hannover.de/Arbeiten/Publikationen/2004/chirita04personalized.pdf, 10 pages, Germany.

Kormann et al., Risks of the Passport Single Signon Protocol, Computer Networks, 2000, 8 pages, Florham Park, New Jersy, USA.

Lee et al., An adaptive Authentication Protocol based on Reputation for Peer-to-Peer System, The 2003 Symposium on Cryptography and Information Security, Jan. 26-29, 2003, pages, Hamamatsu, Japan.

Windley et al., Using Reputation to Augment Explicit Authorization, 2007, 10 pages, Provo, Utah, USA.

* cited by examiner

LEVERAGING GLOBAL REPUTATION TO INCREASE PERSONALIZATION

BACKGROUND

When interacting with online applications, a user may receive electronic communications including subjective content from a given entity. Subjective content is content that some users want to receive and that other users do not want to receive (e.g., grey mail). For example, some users enjoy receiving electronic communications including promotions, advertisements, invitations to join user groups, and newsletters while other users do not which to receive such electronic communications. Thus, there are some users that may want to interact with a given entity while other users may prefer to avoid interacting with the entity. In another example, in the email domain, there are senders who send "grey mail". "Grey mail" contains subjective content that some users want and find useful while other users consider the content spam (e.g., legitimate advertisements and newsletters). And in other domains, content provided by email senders, Web publishers, e-commerce entities, and software producers often contain subjective content that some users like to receive but that other users would like to avoid. In these "grey mail" situations, users would greatly benefit from personalization. Unfortunately, it can be time consuming and difficult for a user to configure such a personalized system. And, a completely automated system with no user feedback would not be able to determine the users' preferences with respect to "grey mail" situations.

SUMMARY

Embodiments of the invention overcome one or more vulnerabilities associated with the determining a user's preference with respect to "grey mail" content and the like. Aspects of the invention provide reputation information to a user regarding the source of an electronic communication. When the client receives an electronic communication, the client queries a reputation data store for reputation information regarding a source of the electronic communication. The client receives the reputation information from the reputation data store and either stops the communication if the reputation is universally bad, allows the communication if the reputation is universally good, or displays the reputation information to the user. The user then decides whether to interact with the source of the electronic communication based on the displayed reputation information and the user's personal preferences.

Other aspects of the invention include managing the user's interaction with the electronic communication based on this feedback. For example, blocking the user from interacting with the electronic communication if a expected benefit score of the reputation information is below a first threshold and allowing the user to interact with the electronic communication if the expected benefit score is above a second threshold provides personalized management of electronic communications with the user. Also, if the expected benefit score is between the first and second thresholds, the reputation information is displayed to the user and the user decides whether to interact with the source of the electronic communication based on the displayed reputation information.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
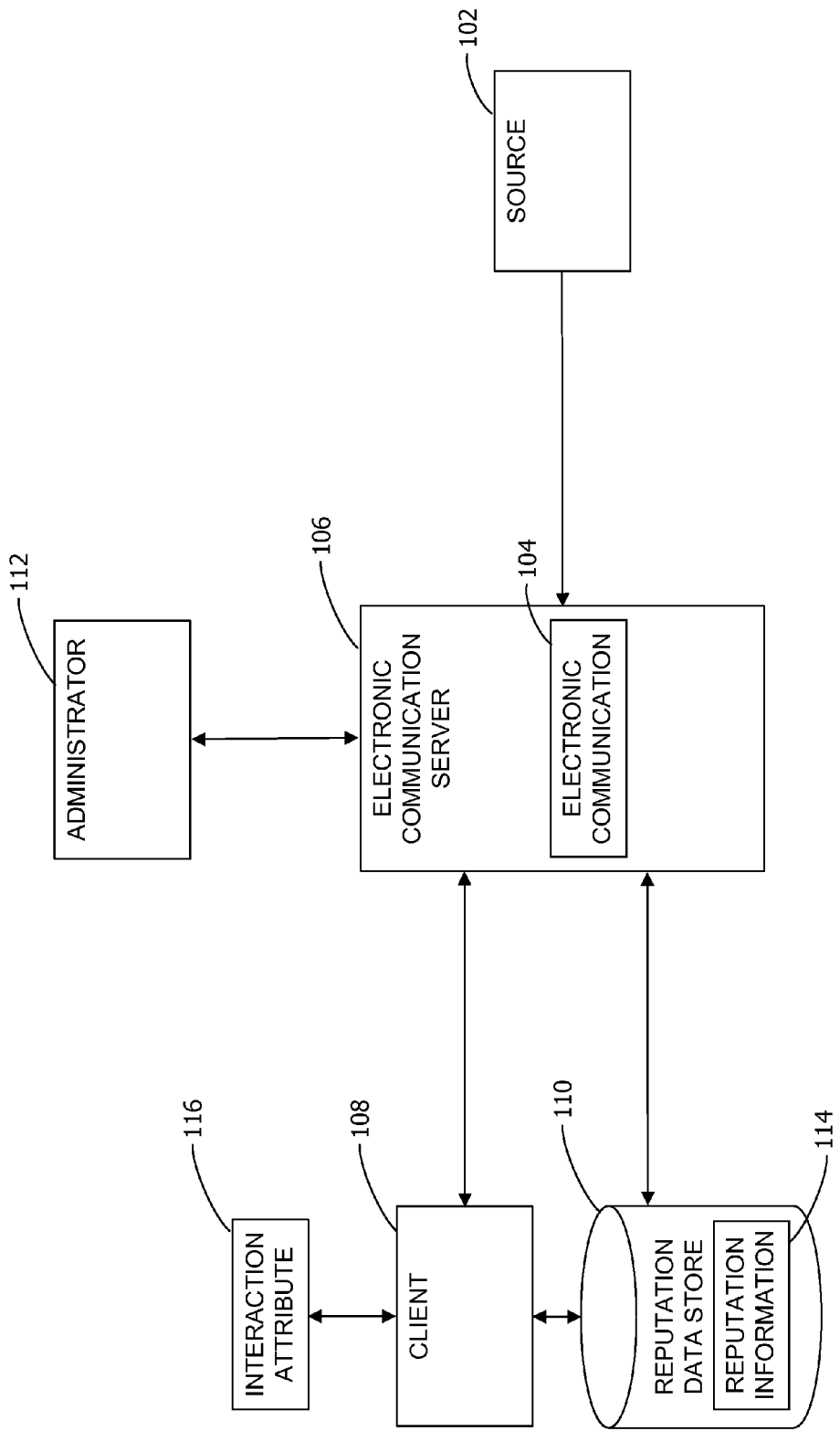
FIG. 1 is a block diagram illustrating one example of a suitable computing system environment in which the invention may be implemented

Referring now to the drawings, aspects of the invention utilize a reputation data store for providing reputation information to a user regarding the source of an electronic communication. The user may receive a variety of transactions from a variety of online services, including receiving an email, receiving instant messages, and receiving web page search results. Users may differ in their opinions with respect to "grey mail" type electronic communications and, consequently, the ability to personalize the receipt of such electronic communications is important to the user experience.

FIG. 1 illustrates a system according to an embodiment of the invention for managing electronic communications from a source based on the reputation information 114 of the source 102. For instance, the reputation information 114 regards the source 102 of an electronic communication 104 including, an electronic communication server 106, a client 108, and a reputation data store 110. In an embodiment, the electronic communication 104 includes one or more of the following: a blog entry, a SMS (Short Message Service) message, a chat room message, a web page, a text message, an email message, an instant messenger message, and the like.

The client 108 receives an electronic communication 104 from a source.

In an embodiment, the client 108 downloads the electronic communications 104 from the electronic communication server 106. Alternatively, the user accesses the electronic communications 104 on the electronic communication server 106 via the client 108.

In response to receiving the electronic communication 104, the client 108 queries a reputation data store 110 for reputation information 114 regarding a source 102 of the electronic communication 104. In an embodiment, the reputation information 114 is associated with the electronic communication server 106. Alternatively, the reputation data store 110 is associated with a reputation server and the electronic communication server 106 caches a copy of the reputation data store. In another embodiment, the client 108 queries the reputation server for reputation information 114 regarding a source 102 of the electronic communication 104. In yet another embodiment, the reputation information 114 provides an indication if the source 102 is associated with subjective content. Subjective content is content that some users want to receive and that other users do not want to receive (e.g., grey mail). For example, some users enjoy receiving electronic communications including promotions, advertisements, invitations to join user groups, and newsletters while other users do not which to receive such electronic communications.

And, in response to the query, the reputation data store 110 searches for information regarding the reputation of the source 102 of the electronic communication 104. In an embodiment, the source 102 of the electronic communication 104 may be determined from one or more of the following: a sender's email address, a domain which hosts the electronic communication 104, a domain which sent the electronic communication 104, an internet protocol (IP) address of the computer used to send the electronic communication 104, an internet protocol (IP) address of the computer hosting the electronic communication 104, a purported responsible domain (PRD) of the electronic communication 104, and a URL (Uniform Resource Location) associated with the electronic communication 104.

The reputation of a source may be determined in a number of ways. For example, the user of the electronic communication systems may be asked rate a number of electronic communications 104 from a source 102. The rating indicates if the user would like to receive the same or similar communications from the source. Alternatively, the source's reputation may be determined from the number of users who choose to interact with the source 102. In another alternative, the source's reputation may be determined by the number of electronic communications the source 102 has sent that includes undesirable content (e.g., SPAM, viruses, phishing attacks, pharming attacks, pornography, hate speech). In yet another alternative, a machine learning algorithm can be utilized to score the reputation of the source 102 based on previously sent electronic communications 104 and determine the probably the current electronic communication 104 sent by the source 102 and received by the user includes undesirable content. One skilled in the art recognizes that two or more of these techniques can be combined to determine the reputation information 114 of a source 102.

According to aspects of the invention, client 108 receives the reputation information 114 from the reputation data store 110 in response to the query. The reputation information 114 provides an indication of a degree of safety, i.e., how safe it is for the user to interact with the source 102 of the electronic communication 104. The client 108 then displays the received reputation information 114 for electronic communication 104 to the user. The user selects whether to interact with the source 102 of the electronic communication 104 based on the displayed reputation information 114. The user's selection is stored as an interaction attribute value 116. The interaction attribute value 116 determines whether the user receives subsequent electronic communications 104 from the source 102. The interaction attribute value 116 may be stored in a memory location associated with the client 108 (as illustrated in FIG. 1), the electronic communication server 106 or both as well as any other location accessible by the client 108.

Alternatively, the client 108 provides the reputation information 114 to an administrator 112. The administrator 112 decides whether or not the user may interact with the source 102 of the electronic communication 104 based on the reputation information 114. The client 108 then allows or blocks the user from interacting with the source 102 based on the administrator's decision. In this embodiment, the administrator's 112 selection is stored as the interaction attribute value 116. The interaction attribute value 116 determines whether the user receives subsequent electronic communications 104 from the source 102.

Figure 2:
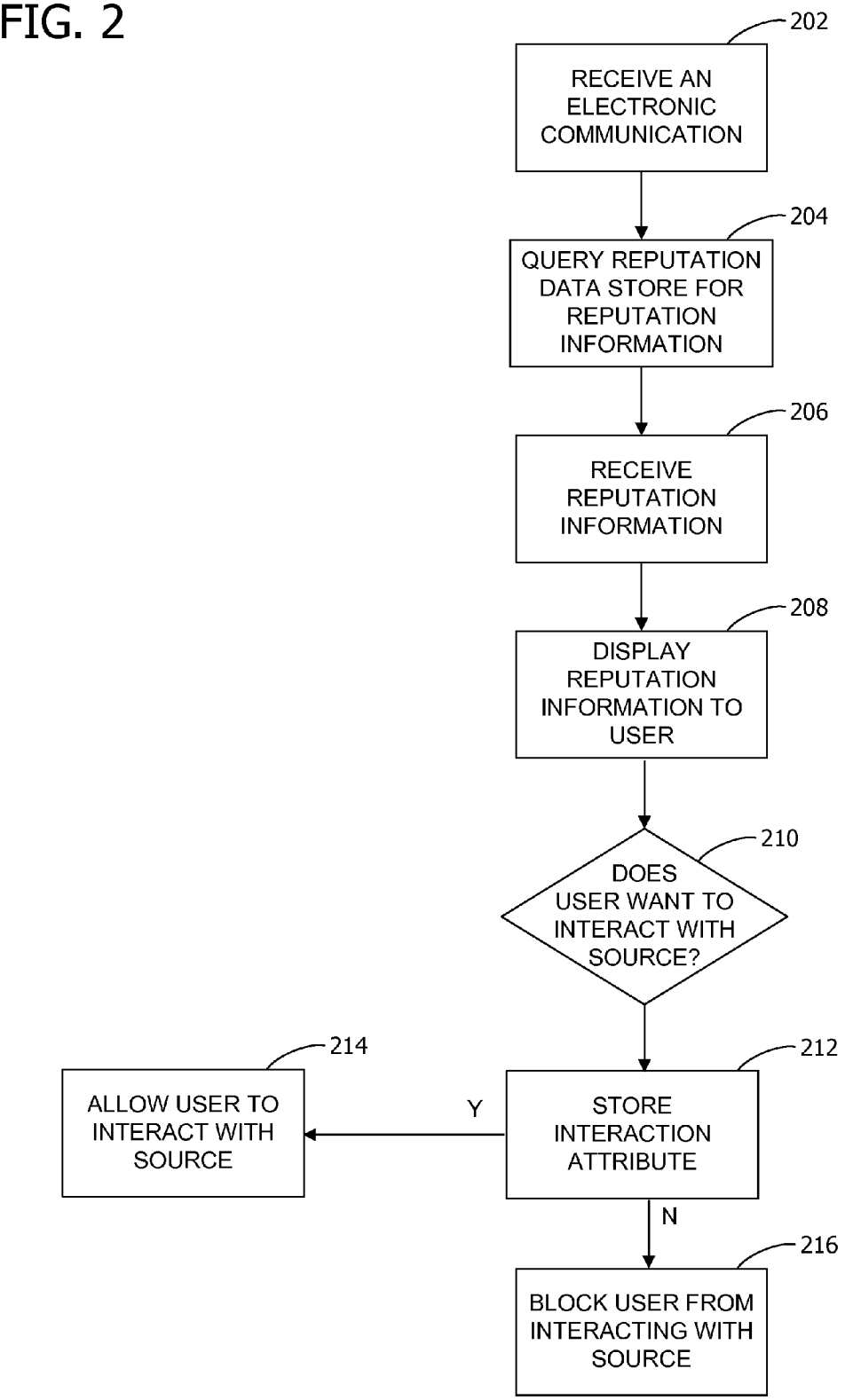
FIG. 2 is an exemplary flow diagram illustrating a method for managing electronic communications from a source to a user based on the reputation information of the source.

FIG. 2 is a flow diagram for a method for managing electronic communications 104 from a source 102 to a user based on the reputation information 114 of the source 102. In an embodiment, the source 102 of the electronic communication 104 is indicated by one or more of the following: a sender's email address, a domain which hosts the electronic communication 104, a domain which sent the electronic communication 104, an internet protocol (IP) address of the computer used to send the electronic communication 104, an internet protocol (IP) address of the computer hosting the electronic communication 104, a purported responsible domain (PRD) of the electronic communication 104, and a URL (Uniform Resource Location) of the electronic communication 104. PRD is part of RFC 4405, SMTP Service Extension for Indicating the Responsible Submitter of an E-Mail Message. As defined in the RFC, a responsible submitter is the entity most recently responsible for injecting a message into the e-mail transport stream and the e-mail address of the responsible submitter is referred to as the Purported Responsible Address (PRA) of the message. The (PRD) is the domain portion of that address.

At 202, the client 108 receives an electronic communication 104 from a source 102. In an embodiment, the electronic communication 104 includes one or more of the following: a blog entry, a SMS (Short Message Service) message, a chat room message, a web page, a text message, an email message, and an instant messenger message. The selection of the electronic communication 104 indicates that the user wants to interact with the electronic communication 104. Alternatively, the user may want to interact with a link and/or an attachment included in the electronic communication 104. For example, the indication received by the client 108 may be in response to one or more of the following: the user opening an email inbox, the user selecting a link to a web page included in the electronic message 104, the user viewing search results from an online search of web pages, the user browsing to a web page, the user browsing to an online store, and the user downloading software via the internet.

At 204, in response to receiving the electronic communication at 202, the client 108 queries the reputation data store 110 for reputation information 114 regarding a source 102 of the electronic communication 104. In an embodiment, the reputation information 114 provides an indication if the source 102 is associated with subjective content. And, in response to the query, the reputation data store 110 searches for information regarding the reputation of the source 102 of the electronic communication 104. For example, the reputation information 114 may include one or more of the following: the source 102 of the electronic communication 104, a safety score indicating how safe it is to interact with the source 102 of the electronic communication 104, a current popularity score indicating how many other users have chosen to interact with the source 102 of the electronic communication 104, and an expected benefit score indicating the expected benefit of soliciting the user's preference regarding the source 102 of the electronic communication 104.

Alternatively, the client 108 queries the reputation data store 110 for reputation information 114 regarding a source 102 of the electronic communication 104 in response to one or more of the following: the user opening an email inbox, the user viewing search results from an online search of web pages, the user browsing to a web page, the user browsing to an online store, and the user downloading software via the internet.

At 206, the client 108 receives the reputation information 114 from the reputation data store 110. The reputation information 114 provides an indication of how safe it is for the user to interact with the source 102 of the electronic communication 104.

At 208, the client 108 displays the reputation information 114 for electronic communication 104 to the user. And, at 210, the user selects whether to interact with the source 102 of the electronic communication 104 based on the displayed reputation information 114. And, at 212, the user's selection is stored as an interaction attribute value 116. The interaction attribute value determines whether the user interacts with the source for subsequent electronic communications. At 214 the client 108 allows the user to interact with the electronic communication 104, if the user selected to interact with the source at 210. If not, the client 108 blocks the user from interacting with the electronic communication 104 at 216.

Alternatively, the client 108 blocks the user from interacting with the electronic communication 104 if the safety score included in the reputation information 114 is below a first threshold and allows the user to interact with the electronic communication 104 if the safety score is above a second threshold, the first threshold is less than the second threshold. In the case where the safety score is below the first threshold, interaction with the source 102 is unsafe and should be prevented. For example, for an email, the client 108 can delete the mail without displaying it to the user, or a web browser can display a message instead of instead of navigating to a site when a user tries to browse to a confirmed phishing site. On the other hand, if the safety score is above a second threshold, the source is known to be safe and the interaction can proceed without interruption.

And, in this embodiment, if the safety score of the electronic communication 104 is between the first and second thresholds, the reputation information 114 is displayed to the user at 208 and the user decides whether or not to interact with the source 102 at 210. In this case, the source 102 is known to be safe but it is determined that the user would benefit from specifying a preference with respect to the source 102. The client 108 solicits the user's preference regarding the source 102 before proceeding or stopping the interaction based on the user's preference. Advantageously, users will be solicited far less than if the reputation data store 110 was not used to determine the safe and subjective sources. For example, an email server can typically classify over half of a user's received email as from known good or bad sources 102 and solicitation is not necessary for this email. The user's solicited preferences can then be stored to automatically benefit both the current user and other users in the future via feedback to the reputation data store 110.

For example, an electronic communication 104 from any source 102 that is known to be malicious is likely unsafe to display to the user for reading or soliciting preferences. If the electronic communication 104 is safe (e.g., it has been cleared by a virus checker/SPAM filter), the reputation data store 110 computes a list of sources determined to be beneficial to solicit personal preferences on (e.g., the source's from address paired with the connecting server's IP) along with "current popularity" and "expected benefit" scores. The expected benefit scores can be used by the reputation data store 110 to prioritize solicitation and the current popularity scores may make the experience more user-friendly (e.g., "This is an email from newsletter@foo.com. 70% of users want the email they receive from this sender, but 30% do not. Would you like to continue receiving email from newsletter@foo.com?").

In one embodiment, the expected benefit scores reflect not only benefits for the user's current interaction, but also for expected future interactions. Therefore, soliciting preferences for an active source is likely more beneficial in the long term than soliciting for a low volume source. These scores may also reflect expected benefits for other users. For example, soliciting personalized preferences on new or uncertain sources 102 can broaden and increase the accuracy of the reputation data store 110, in turn (i) providing more focused solicitation from other users and (ii) allowing for directly inferred preferences across groups of similar users without explicitly soliciting preferences from all users in each group. In this embodiment, the displaying at step 208 occurs based on the expected benefit of soliciting the user's preference regarding the source 102 of the electronic communication 104.

Alternatively or additionally, the client 108 receives a response from the user indicating an action to perform based on the reputation information 114 displayed at 208. The response from the user provides the client 108 with an option to perform one or more of the following actions: add the source 102 to a safe list, unsubscribe from the source 102, add the source 102 to a block list, send feedback to the source 102 of electronic communication 104, and subscribe to the source 102. Additionally, the user may allow this electronic communication just this time and the reputation data store 110 will be queried the next time the user receives an electronic communication from this source. And, in another embodiment, the response is provided to the reputation data store 110 and the reputation data store 110 adjusts the reputation of the source 102 based on the response.

Figure 3:
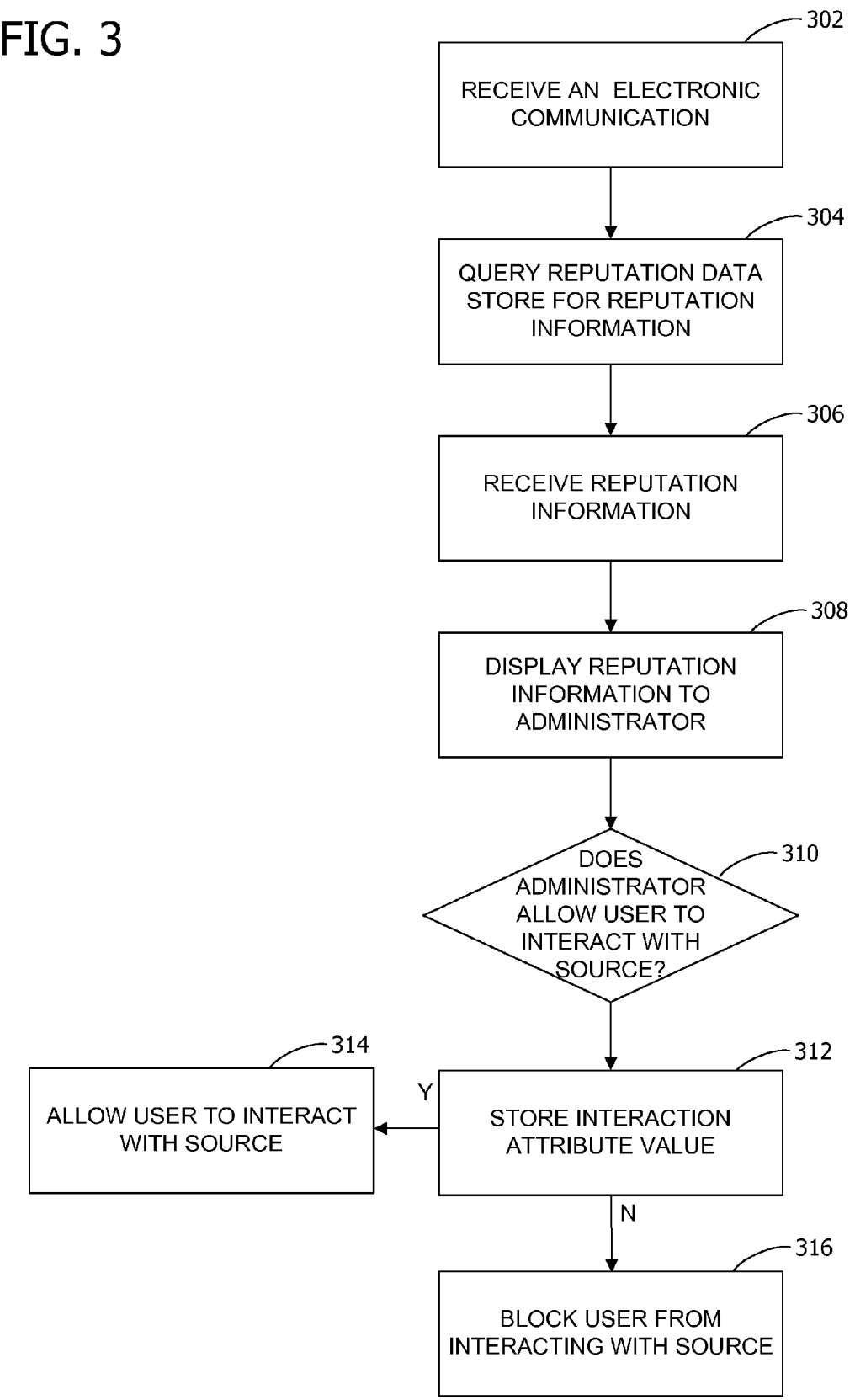
FIG. 3 is an exemplary flow diagram illustrating a method for allowing an administrator to manage electronic communications from a source to a user based on the reputation information of the source.

FIG. 3 is an exemplary flow diagram for a method for allowing an administrator 112 to manage electronic communications 104 from a source 102 to the user based on the reputation information 114 of the source 102. In an embodiment, the administrator 112 is a parent and the user is a child of the parent. Alternatively, the administrator 112 is an information technology administrator of an organization and the user is an employee of the organization.

In an embodiment, the source 102 of the electronic communication 104 includes one or more of the following: a sender's email address, a domain which hosts the electronic communication 104, a domain which sent the electronic communication 104, an internet protocol (IP) address of the computer used to send the electronic communication 104, an internet protocol (IP) address of the computer hosting the electronic communication 104, a purported responsible domain (PRD) of the electronic communication 104, and a URL (Uniform Resource Location) of the electronic communication 104.

At 302, the client 108 receives an electronic communication 104. In an embodiment, the electronic communication 104 includes one or more of the following: a blog entry, a SMS message, a chat room message, a web page, a text message, an email message, and an instant messenger message. And, in response to receiving the electronic communication at 302, the client 108 queries the reputation data store 110 for reputation information 114 regarding a source 102 of the electronic communication 104 at 304. In response to the query, the reputation data store 110 searches for information regarding the reputation of the source 102 of the electronic communication 104.

At 306, the client 108 receives the reputation information 114 from the reputation data store 110. The reputation information 114 provides an indication of how safe it is for the user to interact with the source 102 of the electronic communication 104. For example, the reputation information 114 may include one or more of the following: the source 102 of the electronic communication 104, a safety score indicating how safe it is to interact with the source 102 of the electronic communication 104, a current popularity score indicating how many other third parties have allowed other users to interact with the source 102 of the electronic communication 104, and an expected benefit score indicating the expected benefit of soliciting the administrator's preference regarding the source 102 of the electronic communication 104.

At 308, the client 108 displays or forwards the reputation information 114 for electronic communication 104 to the administrator 112. At 310, the administrator 112 selects whether the user may interact with the source 102 of the electronic communication based on the reputation information 114. And, at 312, the administrator's selection is stored as an interaction attribute value 116. The interaction attribute value 116 determines whether the user interacts with the source for subsequent electronic communications. If the administrator 112 selected that the user may interact with the source 102 at 310, the client 108 allows the user to interact with the electronic communication at 314. If not, the client 108 blocks the user from interacting with the electronic communication at 316.

In an alternative embodiment, at 310, the administrator 112 may allow the user to select whether the user may interact with the source 102 of the electronic communication based on the reputation information 114. In this case, the reputation information is displayed to the user and the user selects whether the user may interact with the source 102 of the electronic communication based on the reputation information 114.

In an embodiment, the client 108 receives a response from the administrator 112 indicating an action to perform based on the reputation information 114 displayed at 308. The response indicates the client 108 should perform one or more of the following: add the source 102 to a safe list, unsubscribe from the source 102, add the source 102 to a block list, send feedback to the source 102 of electronic communication 104, and subscribe to the source 102.

Alternatively, the client 108 blocks the user from interacting with the electronic communication 104 if the safety score included in the reputation information 114 is below a first threshold and allows the user to interact with the electronic communication 104 if the safety score is above a second threshold, the first threshold is less than the second threshold. And, in this embodiment, if the safety score of the electronic communication 104 is between the first and second thresholds, the reputation information 114 is displayed to the administrator 112 at 308 and the administrator 112 decides whether or not the user may interact with the source 102 at 310. For example, rather than require the information technology administrator to specify all sources 102 that are allowed to send email to their corporate accounts, the information technology administrator can specify a safe default policy based on the first and second thresholds and the administrator will be asked before any subjective content is delivered to employee (user) inboxes. Likewise, a parent can specify a similar policy for Web domains, requiring that the parent be consulted before a child is allowed to browse to any domains with subjective content.

Figure 4:
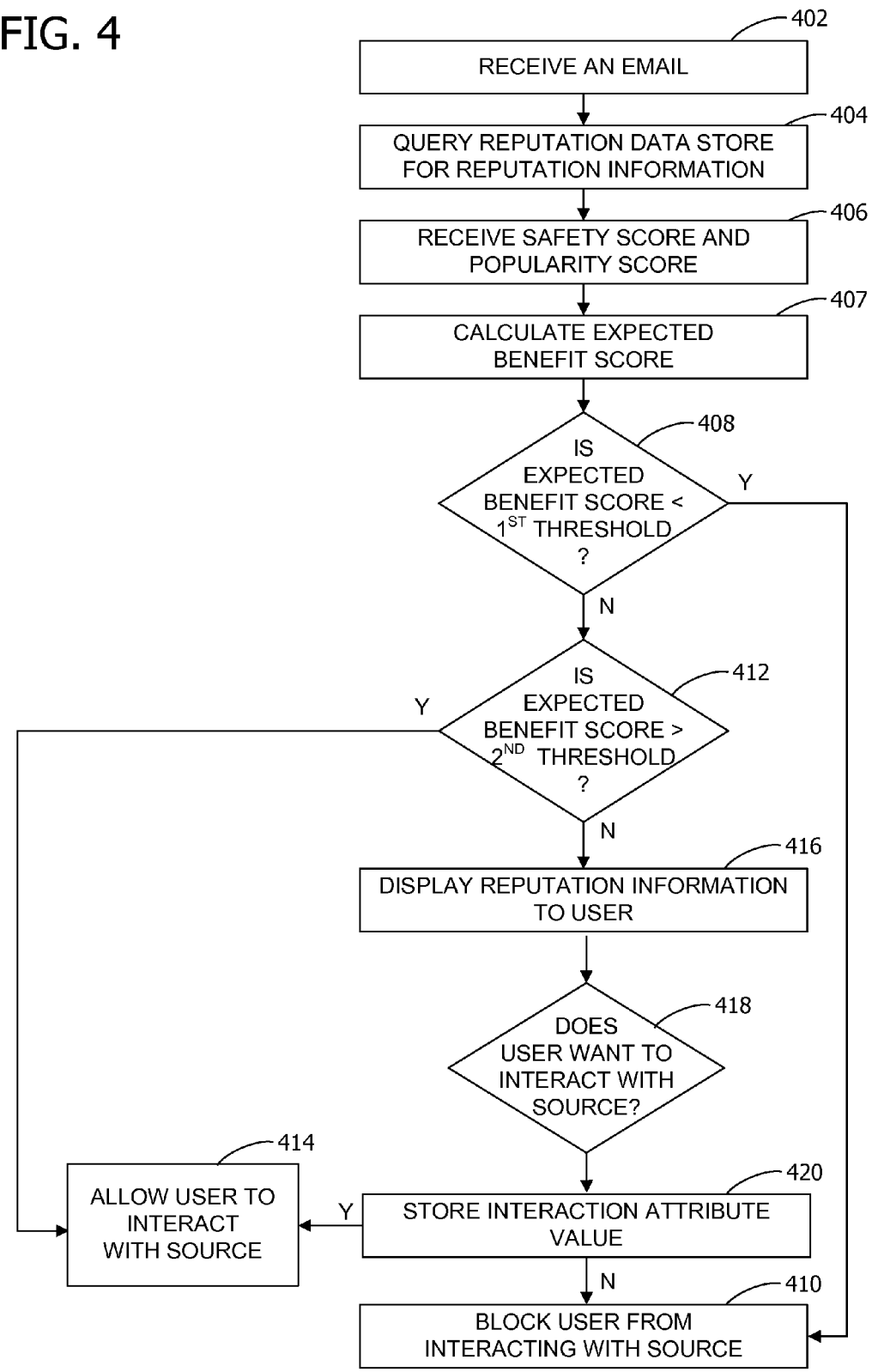
FIG. 4 is an exemplary flow diagram illustrating a method for providing reputation information to a user regarding the source of an email.

FIG. 4 is a flow diagram according to an embodiment of the invention for a method for providing reputation information 114 to a user regarding the source 102 of an email. At 402, the client 108 receives an email (e.g., electronic communication 104).

At 404, in response to receiving the email at 402, the client 108 queries the reputation data store 110 for reputation information 114 regarding a source 102 of the email. And, in response to the query, the reputation data store 110 searches for information regarding the reputation of the source 102 of the email. The reputation information 114 includes a safety score indicating how safe it is to interact with the source 102 of the email, a current popularity score indicating how many other users have chosen to interact with the source 102 of the email, and an expected benefit score indicating the expected benefit of soliciting the user's preference regarding the source 102 of the email. In an embodiment, the reputation information 114 provides an indication if the source 102 is associated with subjective content.

The safety score may be calculated by a variety of techniques known to those skilled in the art. For example, the reputation data store 110 may track statistics about the source 102, such as sending volumes and junk complaints, to assign safety scores to the source 102. In another example, the reputation data store 110 mines electronic communication 104 samples to find distributed spam attacks (e.g., bot attacks), which allows the reputation data store 110 to maintain a list of sources 102 that are clearly unsafe and have safety scores that reflect that they are unsafe.

At 406, the client 108 receives the reputation information 114 from the reputation data store 110. The reputation information 114 provides an indication of how safe it is for the user to interact with the source 102 of the email. The reputation information 114 includes a safety score indicating how safe it is to interact with the source of the email and a current popularity score indicating how many other users have chosen to interact with the source of the email. In an embodiment, the source 102 of the email includes one or more of the following: a sender's email address, a domain which hosts the email, a domain which sent the email, an internet protocol (IP) address of the computer used to send the email, an internet protocol (IP) address of the computer hosting the email, a purported responsible domain (PRD) of the email, and a URL (Uniform Resource Location) of the email. At 407, the client computers an expected benefit score based on the received safety score and the received popularity score.

At 408, the client 108 determines if the expected benefit score included in the reputation information 114 is below a first threshold. If the expected benefit score is below a first threshold, the client blocks the user from interacting with the source of email at 410. If not, at 412, the client 108 determines if the expected benefit score included in the reputation information 114 is above a second threshold. If the expected benefit score is above a second threshold, the client 108 allows the user to interact with the source of the email at 414.

And, if the expected benefit score is not above the second threshold, the client 108 displays the reputation information 114 for email to the user at 416. For example, suppose the source 102 sends many emails to a large number of users on a regular basis. In this case the expected benefit is high because the user can use the reputation information 114 to personalize his or her own experience while providing beneficial feedback regarding the reputation of the source 102 for other users. In another example, if the source 102 of the email only sends a few messages to limited number of users, expected benefit will be lower because the volume of emails sent from the source is low enough that any unwanted emails from the source 102 will not have a significant impact on the user's experience or the experiences of other users.

At 418, the user selects whether to interact with the source 102 of the email based on the displayed reputation information 114. In an embodiment, all emails falling into this category (safety score is between the first and second thresholds) are placed in a "grey mail" folder instead of the inbox folder of the user.

At 420, the user's selection is stored as an interaction attribute value 116. The interaction attribute value 116 determines whether the user interacts with the source for subsequent emails. If the user selected to interact with the source at 418, the client 108 allows the user to interact with the email at 414. If not, the client 108 blocks the user from interacting with the email at 410.

Alternatively or additionally, the client 108 may receive a response from the user indicating an action to perform based on the reputation information 114 displayed at 416. The response from the user indicates the client 108 should perform one or more of the following actions: add the source 102 to a safe list, unsubscribe from the source 102, add the source 102 to a block list, send feedback to the source 102 of electronic communication 104, and subscribe to the source 102. And, in another embodiment, the response is provided to the reputation data store 110 and the reputation data store 110 adjusts the reputation of the source 102 based on the response.

In another embodiment, the first and second thresholds vary by user. For example, if a user has a low tolerance for subjective email, the first threshold may be set so that most "grey mail" type emails will be blocked at 410. On the other hand, another user may prefer to select whether to interact with the source 102 of the email based on the displayed reputation information. In this case, the first and second thresholds may be set so the reputation information for most emails is displayed to the user at 416.

Referring again to FIG. 1, FIG. 1 shows one example of a general purpose computing device in the form of a computer (e.g., electronic communication server 106, client 108, reputation data store 110). In one embodiment of the invention, a computer such as the electronic communication server 106, the client 108, and the reputation data store 110 are suitable for use in the other figures illustrated and described herein. The computer (e.g., electronic communication server 106, client 108, reputation server) has one or more processors or processing units and a system memory.

The computer (e.g., electronic communication server 106, client 108, reputation server) typically has at least some form of computer readable media. Computer readable media, which include both volatile and nonvolatile media, removable and non-removable media, may be any available medium that may be accessed by computer (e.g., electronic communication server 106, client 108, reputation server). By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., electronic communication server 106, client 108, reputation server).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

A user may enter commands and information into computer (e.g., electronic communication server 106, client 108, reputation server) through input devices or user interface selection devices such as a keyboard and a pointing device (e.g., a mouse, trackball, pen, or touch pad). Other input devices may include a microphone, joystick, game pad, satellite dish, scanner, or the like. A monitor or other type of display device is also connected to system bus via an interface, such as a video interface.

The computer (e.g., electronic communication server 106, client 108, reputation server) may operate in a networked environment using logical connections. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In a networked environment, program modules depicted relative to computer (e.g., electronic communication server 106, client 108, reputation server), or portions thereof, may be stored in a remote memory storage device. The network connections shown are exemplary and other means of establishing a communications link between the computers may be used.

Generally, the data processors of computer (e.g., electronic communication server 106, client 108, reputation server) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

Although described in connection with an exemplary computing system environment, including computer (e.g., electronic communication server 106, client 108, reputation server), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., electronic communication server 106, client 108, reputation server) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-executable method of a processor of a computing device, said processor configured for managing electronic communications from a source to a user based on reputation information of the source, said method comprising:

receiving an electronic communication from a source;
querying, in response to the received electronic communication, a reputation data store for reputation information regarding the source of the received electronic communication;
receiving the reputation information from the reputation data store in response to said querying, said reputation information including a safety score and a current popularity score, said safety score providing an indication of a degree of safety for the user to interact with the source of the received electronic communication, said current popularity score indicating how many of all other users have chosen to interact with the source of the received electronic communication;
when the safety score is below a first threshold, blocking the user from interacting with the received electronic communication;
when the received safety score is above the first threshold and below a second threshold, said second threshold greater than the first threshold:
displaying, to the user, the received reputation information for the received electronic communication, wherein the user selects whether to interact with the source of the received electronic communication based on the current popularity score; and
storing the user's selection as an interaction attribute value, said interaction attribute value determining whether the user receives subsequent electronic communications from the source of the received electronic communication; and
when the safety score is above the second threshold, allowing the user to interact with the received electronic communication.

2. The method of claim 1, wherein the source of the electronic communication includes one or more of the following: a sender's email address, a domain hosting the electronic communication, a domain sending the electronic communication, an internet protocol (IP) address of the computer used to send the electronic communication, an internet protocol (IP) address of the computer hosting the electronic communication, a purported responsible domain (PRD) of the electronic communication, and a URL (Uniform Resource Location) associated with the electronic communication.

3. The method of claim 1, further comprising receiving a response from the user indicating an action to perform based on the displayed reputation information, said response indicating one or more of the following: add the source to a safe list, unsubscribe from the source, add the source to a block list, send feedback to the source of electronic communication, subscribe to the source, and allow interaction with the electronic communication in this instance.

4. The method of claim 3, further comprising modifying the reputation information of the source stored in the reputation data store based on the response.

5. The method of claim 1, wherein the electronic communication includes one or more of the following: a blog entry, a SMS (Short Message Service) message, a chat room message, a web page, a text message, an email message, and an instant messenger message.

6. The method of claim 1, wherein querying occurs in response to one or more of the following: the user opening an email inbox, the user viewing search results from an online search of web pages, the user browsing to a web page, the user browsing to an online store, and the user downloading software via the internet.

7. The method of claim 1, wherein the reputation information further comprises an expected benefit score indicating the expected benefit of soliciting the user's preference regarding the source of the electronic communication.

8. The method of claims 7, wherein the user selects whether to interact with the source of the electronic communication based on the current popularity score and the expected benefit of soliciting the user's preference regarding the source of the electronic communication.

9. A computer-executable method of a processor of a computing device for allowing an administrator to manage electronic communications from a source to a user based on the reputation information of the source, said method comprising:
- in response to the user receiving an electronic communication from a source, querying a reputation data store for reputation information regarding the source of the electronic communication;
- receiving the reputation information from the reputation data store in response to said querying, said reputation information including a safety score and a current popularity score, said safety score providing an indication of a degree of safety for the user to interact with the source of the received electronic communication, said current popularity score indicating how many of all other third parties have allowed other users to interact with the source of the received electronic communication;
- when the safety score is below a first threshold, blocking the user from interacting with the received electronic communication;
- when the safety score is above the first threshold and below a second threshold, said second threshold greater than the first threshold:
  - displaying, to an administrator, the received reputation information for the received electronic communication, wherein the administrator selectively allows the user to interact with the source of the received electronic communication based on the displayed reputation information including the current popularity score of the source; and
  - storing an interaction attribute value representative of the administrator selectively allowing the user to interact with the source, said interaction attribute value determining whether the administrator allows the user to interact with an electronic communication subsequently received from the source; and
- when the received safety score is above the second threshold, allowing the user to interact with the electronic communication.

10. The method of claim 9, wherein the administrator is a parent and the user is a child of the parent.

11. The method of claim 9, wherein the administrator is an information technology administrator of an organization and the user is an employee of said organization.

12. The method of claim 9, wherein the reputation information further includes an expected benefit score indicating the expected benefit of soliciting the administrator's preference regarding the source of the electronic communication.

13. The method of claim 9, wherein the source of the electronic communication includes one or more of the following: a sender's email address, a domain hosting the electronic communication, a domain sending the electronic communication, an internet protocol (IP) address of the computer used to send the electronic communication, an internet protocol (IP) address of the computer hosting the electronic communication, a purported responsible domain (PRD) of the electronic communication, and a URL (Uniform Resource Location) of the electronic communication.

14. The method of claim 9, further comprising receiving a response from the administrator indicating an action to perform based on the displayed the reputation information, said response indicating one or more of the following: add the source to a safe list, unsubscribe from the source, add the source to a block list, send feedback to the source of electronic communication, subscribe to the source, and allow interaction with the electronic communication in this instance.

15. The method of claim 9, wherein the electronic communication includes one or more of the following: a blog entry, a SMS message, a chat room message, a web page, a text message, an email message, and an instant messenger message.

16. A computer-executable method of an electronic communication server for providing reputation information to a user regarding the source of an email, said method comprising:
- receiving an email from a source;
- querying a reputation data store in response to the received email for reputation information regarding the source of the email, said reputation information including a safety score indicating how safe it is to interact with the source of the email and a current popularity score indicating how many of all other users have chosen to interact with the source of the email;
- receiving the reputation information from the reputation data store in response to said querying;
- blocking the user from interacting with the source of the email when the safety score is below a first threshold;
- allowing the user to interact with the source of the email when the safety score is above a second threshold, said first threshold being less than the second threshold;
- displaying the reputation information including the current popularity score when the safety score of the email is between the first and second thresholds, wherein the user selects whether to interact with the source of the email based on the displayed current popularity score; and
- storing the user's selection as an interaction attribute value, said interaction attribute value determining whether the user interacts with the source for subsequent emails.

17. The method of claim 16, wherein the source of the email includes one or more of the following: a sender's email address, a domain hosting the email, a domain sending the email, an internet protocol (IP) address of the computer used to send the email, an internet protocol (IP) address of the computer hosting the email, a purported responsible domain (PRD) of the email, and a URL (Uniform Resource Location) associated with the email.

18. The method of claim 16, further comprising modifying the reputation information of the source stored in the reputation data store based on the user's selection.

* * * * *